US011566375B2

(12) United States Patent
Oguchi

(10) Patent No.: US 11,566,375 B2
(45) Date of Patent: Jan. 31, 2023

(54) SHEET MANUFACTURING METHOD

(71) Applicant: SEIKO EPSON CORPORATION, Tokyo (JP)

(72) Inventor: Yuki Oguchi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 210 days.

(21) Appl. No.: 17/088,721

(22) Filed: Nov. 4, 2020

(65) Prior Publication Data

US 2021/0047779 A1 Feb. 18, 2021

Related U.S. Application Data

(62) Division of application No. 15/779,632, filed as application No. PCT/JP2016/084020 on Nov. 17, 2016, now Pat. No. 10,858,783.

(30) Foreign Application Priority Data

Nov. 30, 2015 (JP) .............................. JP2015-232961

(51) Int. Cl.
D21F 9/00 (2006.01)
D21G 9/00 (2006.01)
B27N 3/04 (2006.01)
D04H 1/60 (2006.01)
D21F 13/00 (2006.01)

(52) U.S. Cl.
CPC ............. *D21G 9/0009* (2013.01); *B27N 3/04* (2013.01); *D04H 1/60* (2013.01); *D21F 9/00* (2013.01); *D21F 13/00* (2013.01)

(58) Field of Classification Search
CPC .. D21F 13/00; D21F 9/00; B27N 3/04; D21G 9/0009; D04H 1/60
USPC ........................................................ 162/261
See application file for complete search history.

(56) References Cited

U.S. PATENT DOCUMENTS

| 5,883,242 A | 3/1999 | Kubota et al. |
| 2013/0273190 A1 | 10/2013 | Lee |
| 2014/0027075 A1 | 1/2014 | Yamagami et al. |
| 2014/0374047 A1 | 12/2014 | Yamagami |
| 2015/0275430 A1 | 10/2015 | Higuchi et al. |
| 2016/0010278 A1 | 1/2016 | Yamagami et al. |
| 2016/0332325 A1 | 11/2016 | Murayama et al. |
| 2016/0332333 A1 | 11/2016 | Yamagami et al. |
| 2017/0198434 A1 | 7/2017 | Yamagami |

FOREIGN PATENT DOCUMENTS

| JP | 63-270854 A | 11/1988 |
| JP | 01-250490 A | 10/1989 |
| JP | 05-292774 A | 11/1993 |
| JP | 09-291103 A | 11/1997 |
| JP | 2008-184703 A | 8/2008 |
| JP | 2012-122154 A | 6/2012 |
| JP | 2012-144826 A | 8/2012 |
| JP | 2015-183336 A | 10/2015 |
| WO | 2015/128912 A1 | 9/2015 |

OTHER PUBLICATIONS

Transition of Wet Web from Wire Part to Press Part; Papermaking; published by Japan Technical Association of the Pulp and Paper Industry, Dec. 14, 1998; pp. 171-179.

The Extended European Search Report for the corresponding European Patent Application No. 16870452.6 dated Jun. 27, 2019.

*Primary Examiner* — Mark Halpern

(74) *Attorney, Agent, or Firm* — Global IP Counselors, LLP

(57) ABSTRACT

A sheet manufacturing method includes: a defibrating step of defibrating a raw material containing a fiber in air; a mixing step of mixing a defibrated material defibrated in the defibrating step and a resin in air; a web forming step of forming a web by accumulating the mixture mixed in the mixing step on a moving body; a transporting step of transporting the web; a sheet forming step of forming a sheet from the web; a setting step of setting a thickness of the sheet; and a control step of controlling a moving speed of the moving body and a transporting speed of the web in the transporting step, in accordance with the thickness of the sheet set in the setting step.

9 Claims, 3 Drawing Sheets

SHEET MANUFACTURING METHOD

CROSS-REFERENCE TO RELATED APPLICATIONS

This application is a divisional application of U.S. application Ser. No. 15/779,632 filed on May 29, 2018, which is a U.S. National stage application of International Patent Application No. PCT/JP2016/084020, filed on Nov. 17, 2016, which claims priority under 35 U.S.C. § 119(a) to Japanese Patent Application No. 2015-232961, filed in Japan on Nov. 30, 2015. The entire disclosures of U.S. application Ser. No. 15/779,632 and Japanese Patent Application No. 2015-232961 are hereby incorporated herein by reference.

TECHNICAL FIELD

The present invention relates to a sheet manufacturing apparatus, a control method of the sheet manufacturing apparatus, and a sheet manufacturing method.

BACKGROUND ART

Accumulating a fiber-like material and causing a bonding force between the accumulated fibers to obtain a sheet-like or film-like formed body has been performed for a long time. Typical examples thereof include manufacturing paper by pulp molding (paper-forming) using water. Even in present times, pulp molding is widely used as an example of a method of manufacturing paper. The paper manufactured by pulp molding generally includes a structure by cellulose fibers derived from wood or the like being entangled with one another, and being partially bonded to one another by a binder (paper strengthening agent (such as a starch paste and a water-soluble resin)).

According to the pulp molding, it is possible for the fibers to be accumulated in a state where uniformity is favorable, and, in a case where a paper strengthening agent is used in the bonding between fibers, it is possible for the paper strengthening agent to be dispersed (distributed) in a state where the uniformity in the paper surface is good. However, because the pulp molding is a wet method, it is necessary to use large volumes of water, and the necessity of dewatering and drying, or the like, arises after forming the paper, and therefore the energy or time consumed is extremely large. It is necessary to suitably process the water used as waste water. Accordingly, it is difficult to respond to modern demands for energy savings, environmental protection, and the like. The apparatuses used in pulp molding frequently need large scale utilities such as water, power, and drainage facilities, and size reductions are difficult. From this viewpoint, there is an expectation of methods, referred to as dry methods that use no or almost no water as paper manufacturing methods in place of pulp molding.

As such a method, for example, Japanese Unexamined Patent Application Publication No. 2012-144826 discloses a paper recycling apparatus which includes a dry defibrating unit, and accumulates and forms fibrillated fibers.

In a paper recycling apparatus disclosed in Japanese Unexamined Patent Application Publication No. 2012-144826, the thickness of the paper to be manufactured is measured by a sensor, and depending on the detection result, a speed of a mesh belt for accumulating fibers and a feeding speed of paper (raw material) to be supplied to an apparatus are adjusted, and the thickness of the paper to be manufactured is adjusted.

However, in the apparatus disclosed in Japanese Unexamined Patent Application Publication No. 2012-144826, in a case of increasing the thickness of the paper to be manufactured, the moving speed of the mesh belt is decreased, and further, control for increasing an insertion speed of the paper (raw material) is performed, as necessary. In this manner, in a case where a supply amount is increased by increasing the feeding speed of the paper so as to increase the thickness of the paper to be manufactured, each constituent part that performs a process such as coarse crushing, defibration, and deinking needs to have sufficient processing capacity to handle a large amount of paper (raw material). For this reason, there is a problem in that each of the constituent parts is increased in size and power consumption is increased. Also, when the moving speed of the mesh belt is decreased, the fibers accumulated by a transport roller positioned on the downstream side are pulled, and thus are broken or thinned, and thereby it is difficult to stably manufacture paper in some cases.

An object of some aspects of the invention is to provide a sheet manufacturing apparatus, a control method of the sheet manufacturing apparatus, and a sheet manufacturing method which are capable of stably manufacturing sheets having different thicknesses while maintaining a compact and power saving apparatus configuration.

SUMMARY

The present invention has been made to solve at least a part of the above problems, and can be realized as the following aspects or application examples.

According to an aspect of the invention, there is provided a sheet manufacturing apparatus including a defibrating unit that defibrates a raw material containing a fiber in air; a mixing unit that mixes a defibrated material defibrated by the defibrating unit and a resin in air; a web forming unit that forms a web by accumulating the mixture mixed by the mixing unit on a moving body; a transporting unit that transports the web; a sheet forming unit that forms a sheet from the web; a setting unit that sets a thickness of the sheet; and a controller that controls a moving speed of the moving body and a transporting speed of the web transported by the transporting unit, in accordance with the thickness of the sheet set by the setting unit.

According to the sheet manufacturing apparatus, both of the moving speed of the moving body and the transporting speed of the transporting unit are controlled in accordance with the thickness of the sheet. Therefore, in a case where the thickness of the sheet to be manufactured is changed, tension is more hardly applied to the web transported between the moving body and the transporting unit, and thereby it is less likely that the web is pulled, and thus is broken or thinned. With this, it is possible to stably manufacture the sheet.

In the sheet manufacturing apparatus according to the invention, the controller may change the moving speed of the moving body and the transporting speed of the transporting unit at the same time.

According to the sheet manufacturing apparatus, even in a case where the thickness of the sheet to be manufactured is changed, it is difficult to cause a transport jam to occur, and it is possible to stably manufacture the sheet.

In the sheet manufacturing apparatus according to the invention, the controller may decrease the moving speed of the moving body after decreasing the transporting speed of the transporting unit when decreasing the moving speed of the moving body and the transporting speed of the transporting unit.

According to the sheet manufacturing apparatus, in a case where the thickness of the sheet to be manufactured is changed (set) so as to be increased, tension is more hardly applied to the web, and thereby it is less likely that the web is broken or thinned.

In the sheet manufacturing apparatus according to the invention, the transporting unit includes a first roller pair and a second roller pair that is positioned on the downstream side of the first roller pair, in which the controller may decrease the transporting speed of the first roller pair after decreasing the transporting speed of the second roller pair when decreasing the transporting speed of the transporting unit.

According to the sheet manufacturing apparatus, in a case where the thickness of the sheet to be manufactured is set (changed) to be thicken, it is possible to more stably manufacture the sheet.

In the sheet manufacturing apparatus according to the invention, the transporting speed of the transporting unit may be increased after increasing the moving speed of the moving body when increasing the moving speed of the moving body and the transporting speed of the transporting unit.

According to the sheet manufacturing apparatus, in a case where the thickness of the sheet to be manufactured is set (changed) so as to be thinned, tension is hardly applied to the web, and thereby it is less likely that the web is pulled, and thus is broken or thinned. With this, it is possible to stably manufacture the sheet.

In the sheet manufacturing apparatus according to the invention, the transporting unit includes a first roller pair and a second roller pair that is positioned on the downstream side of the first roller pair, in which the controller may increase the transporting speed of the second roller pair after increasing the transporting speed of the first roller pair when increasing the transporting speed of the transporting unit.

According to the sheet manufacturing apparatus, in a case where the thickness of the sheet to be manufactured is set (changed) so as to be thinned, it is possible to more stably manufacture the sheet.

In the sheet manufacturing apparatus according to the invention, the controller may stepwisely change each of the moving speed of the moving body and the transporting speed of the transporting unit.

According to the sheet manufacturing apparatus, since the thickness of the web is stepwisely changed, for example, insertion into the roller pair becomes smooth, and thereby even in a case where the thickness of the sheet to be manufactured is changed, it is difficult to cause a transport jam to occur, and it is possible to stably manufacture the sheet.

In the sheet manufacturing apparatus according to the invention, the controller may linearly change each of the moving speed of the moving body and the transporting speed of the transporting unit.

According to the sheet manufacturing apparatus, since the thickness of the web is gradually changed, for example, insertion into the roller pair becomes smooth, and thereby even in a case where the thickness of the sheet to be manufactured is changed, it is difficult to cause a transport jam to occur, and it is possible to stably manufacture the sheet.

The sheet manufacturing apparatus according to the invention further includes a supplying unit that supplies an additive agent to the mixing unit, in which the controller may change a supplying amount of the additive agent supplied by the supplying unit in accordance with the thickness of the sheet set by the setting unit.

According to the sheet manufacturing apparatus, even in a case where the thickness of the sheet to be manufactured is changed, it is possible to stabilize the amount of the additive agent (abundance) in the sheet to be manufactured. With this, the mechanical strength of the sheet to be manufactured can be stabilized.

The sheet manufacturing apparatus according to the invention further includes a suction unit that suctions the mixture onto the moving body, in which controller may change a suction force of the suction unit in accordance with the thickness of the sheet set by the setting unit.

According to the sheet manufacturing apparatus, even in a case where the thickness of the sheet to be manufactured is changed, it is possible to stabilize the amount of the additive agent (abundance) in the sheet to be manufactured. With this, the mechanical strength of the sheet to be manufactured can be stabilized.

In the sheet manufacturing apparatus according to the invention, the setting unit is capable of setting the thickness of the sheet to a first thickness and a second thickness larger than the first thickness, and the controller may stop the sheet manufacturing apparatus after setting the moving speed of the moving body and the transporting speed of the transporting unit to a speed in accordance with the first thickness.

According to the sheet manufacturing apparatus, since the thickness of the web remaining between a pair of rollers at the time of stop is the first thickness which is relatively thin, the web is less likely to be loosened, and broken under its own weight.

According to another aspect of the invention, there is provided a control method of a sheet manufacturing apparatus which includes a defibrating unit that defibrates a raw material containing a fiber in air; a mixing unit that mixes a defibrated material defibrated by the defibrating unit and a resin in air; a web forming unit that forms a web by accumulating the mixture mixed by the mixing unit on a moving body; a transporting unit that transports the web; a sheet forming unit that forms a sheet from the web; and a setting unit that sets a thickness of the sheet, the method including controlling a moving speed of the moving body and a transporting speed of the web transported by the transporting unit, in accordance with the thickness of the sheet set by the setting unit.

According to the control method of the sheet manufacturing apparatus, both of the moving speed of the moving body and the transporting speed of the web are controlled in accordance with the thickness of the sheet. Therefore, when the thickness of the sheet to be manufactured is changed, tension is more hardly applied to the web to be transported, and thereby it is less likely that the web is pulled, and thus is broken or thinned. With this, it is possible to stably manufacture the sheet.

According to still another aspect of the invention, there is provided a sheet manufacturing method including a defibrating step of defibrating a raw material containing a fiber in air; a mixing step of mixing a defibrated material defibrated in the defibrating step and a resin in air; a web forming step of forming a web by accumulating the mixture mixed in the mixing step on a moving body; a transporting step of transporting the web; a sheet forming step of forming a sheet from the web; a setting step of setting a thickness of the sheet; and a control step of controlling a moving speed of the moving body and a transporting speed of the web in the transporting step, in accordance with the thickness of the sheet set in the setting step.

According to the sheet manufacturing method, both of the moving speed of the moving body in the web forming step and the transporting speed of the web in the transporting step are controlled in the control step in accordance with the thickness of the sheet. Therefore, when the thickness of the sheet to be manufactured is changed, tension is more hardly applied to the web to be transported, and thereby it is less likely that the web is pulled, and thus is broken or thinned. With this, it is possible to stably manufacture the sheet.

DESCRIPTION OF EMBODIMENTS

Below, various embodiments of the invention will be described. The embodiments described below are for describing examples of the invention. The invention is not limited in any way by the following embodiments, and includes various modifications carried out in a range not departing from the gist of the invention. Not all of the configurations explained below are indispensable configurations in the invention.

1. Sheet Manufacturing Apparatus
1.1. Configuration Overview

Figure 1:
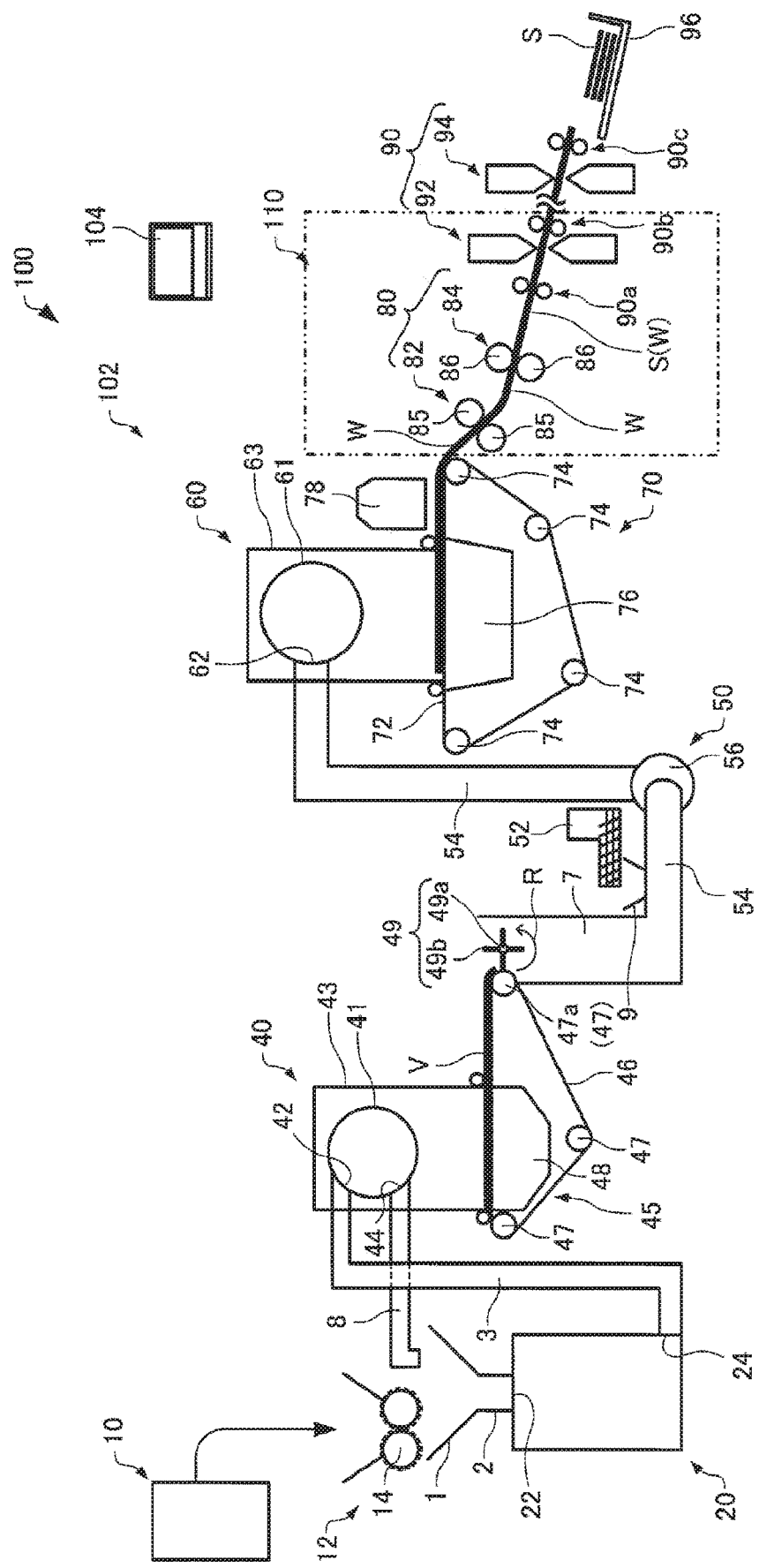
FIG. 1 is a diagram schematically showing a sheet manufacturing apparatus according to an embodiment.

First, a sheet manufacturing apparatus according to the embodiment will be described with reference to the drawings. FIG. 1 is a diagram schematically illustrating a sheet manufacturing apparatus 100 according to the first embodiment.

The sheet manufacturing apparatus 100 is provided with a supplying unit 10, a manufacturing unit 102, and a controller 104, as illustrated in FIG. 1. The manufacturing unit 102 manufactures a sheet. The manufacturing unit 102 includes a crushing unit 12, a defibrating unit 20, a screening unit 40, a first web forming unit 45, a rotating body 49, a mixing unit 50, an accumulation unit 60, a second web forming unit 70, a sheet forming unit 80, and a cutting unit 90.

The supplying unit 10 supplies raw materials to the crushing unit 12. The supplying unit 10 is an automatic feeding unit for continuously feeding the raw materials to the crushing unit 12. The raw materials supplied by the supplying unit 10 include fibers such as recycled pulp and pulp sheets.

The crushing unit 12 cuts the raw material supplied by the supplying unit 10 into small pieces in air. The shape and size of the small pieces is several cm squared. In the examples in the drawings, the crushing unit 12 includes a crushing blade 14, and it is possible for the fed raw materials to be cut by the crushing blade 14. A shredder is used as the crushing unit 12. The raw material cut by the crushing unit 12 is transferred (transported) to the defibrating unit 20 via a pipe 2 once received by a hopper 1.

The defibrating unit 20 defibrates the raw material cut by the crushing unit 12. Here, the wording "defibrates" refers to untangling the raw material (material to be defibrated) in which a plurality of fibers are bonded into individual fibers. The defibrating unit 20 also has a function of causing substances such as resin powder bonded to the raw material, ink toner, or blur-preventing agent to be isolated from the fibers.

The material that passes through the defibrating unit 20 is referred to as a "defibrated material". There are also cases where resin (resin for causing a plurality of fibers to bond to one another) powder isolated from the fibers when the fibers are untangled, colorants such as ink and toner, and additives such as bleeding inhibitors and paper strengthening agents are included in the "defibrated material" in addition to the untangled defibrated material fibers. The shape of the untangled defibrated material is string-like or ribbon-like. The untangled defibrated material may be present in a state of not being entangled with other untangled fibers (independent state) or may be present in a state being entangled with other untangled defibrated material to form a clump (a state of forming a so-called "lump").

The defibrating unit 20 performs defibration in a dry manner. Here, performing a treatment such as defibration not in liquid but in air such as atmosphere is called a dry process. An impeller mill is used as the defibrating unit 20 in the embodiment. The defibrating unit 20 has the function causing an airflow to be generated so as to suction the raw material and discharge the defibrated material. With this, it is possible for the defibrating unit 20 to suction the raw material along with the airflow from an introduction port 22, perform the defibration treatment, and transport the defibrated material to the exit port 24 with the self-generated airflow. The defibrated material that passes through the defibrating unit 20 is transmitted to the screening unit 40 via a pipe 3. Note that, as the air flow for causing the defibrated material to be transported from the defibrating unit 20 to the screening unit 40, an air flow generated by the defibrating unit 20 may be utilized, or an air flow generating device such as a blower may be provided, and an air flow generated therefrom may be used.

The screening unit 40 introduces a defibrated material defibrated by the defibrating unit 20 from the introduction port 42 and screens the material according to fiber length. The screening unit 40 includes a housing portion 43 accommodating a drum portion 41 and a drum portion 41. A sieve is used as the drum portion 41. The drum portion 41 includes a mesh (filter, screen) and is able to divide fibers or particles (first screened material passing through the mesh) that are smaller than the size of the openings of the mesh and included and fibers, non-defibrated pieces or lumps (second screened material not passing through the mesh) larger than the size of the opening in the mesh. For example, the first screened material is transmitted to the mixing unit 50 via the pipe 7. The second screened material is returned to the defibrating unit 20 from the exit port 44 via the pipe 8. Specifically, the drum portion 41 is a cylindrical sieve that is able to rotatably driven by a motor. A metal mesh of the drum portion 41, an expanded metal in which a perforated metal plate is drawn, and a punched metal plate in which holes are formed in a metal plate by a pressing machine or the like are used as the mesh of the drum portion 41.

The first web forming unit 45 transports the first screened material passing through the screening unit 40 to the mixing unit 50. The first web forming unit 45 includes a mesh belt 46, a tensioned roller 47, and a suction unit (suction mechanism) 48.

It is possible for the suction unit 48 to suction the first screened material dispersed in the air after passing through the opening (opening of the mesh) of the screening unit 40 on the mesh belt 46. The first screened material is accumulated on the moving mesh belt 46 and forms the web V. The specific configurations of the mesh belt 46, the tensioned roller 47, and the suction unit 48 are the same as the mesh belt 72, the tensioned roller 74, and the suction mechanism 76 of the second web forming unit 70, described later.

The web V is formed in a state of including large volumes of air and being softly swelled by passing through the screening unit 40 and the first web forming unit 45. The web V accumulated on the mesh belt 46 is fed to the pipe 7 and transported to the mixing unit 50.

The rotating body 49 can cut the web V before transporting the web V to the mixing unit 50. In the examples of the drawings, the rotating body 49 includes a base portion 49a and a projection 49b projecting from the base portion 49a. The projection 49b has a plate shape, for example. In the examples of the drawings, four projections 49b are provided, and the four projections 49b are provided at even intervals. When the base portion 49a is rotated in a direction R, the projection 49b can make the base portion 49a rotated as an axis. When the web V is cut by the rotating body 49, for example, it is possible to reduce fluctuation in the amount of defibrated material per unit time supplied to the accumulation unit 60.

The rotating body 49 is provided in the vicinity of the first web forming unit 45. In the examples of the drawings, the rotating body 49 is provided in the vicinity of (beside the tensioned roller 47a) the tensioned roller 47a positioned on the downstream side in the path of the web V. The rotating body 49 is provided at a position where the projection 49b is in contact with the web V and is not in contact with the mesh belt 46 on which the web V is accumulated. With this, it is possible to suppress the mesh belt 46 from being worn (damaged) by the projection 49b. The shortest distance between the projection 49b and the mesh belt 46 is, for example, in a range of 0.05 mm to 0.5 mm. The mesh belt 46 is the distance at which the web V can be cut without being damaged.

The mixing unit 50 mixes the first screened material (first screened material transported by the first web forming unit 45) passing through the screening unit 40 and the additive agent that includes a resin. The mixing unit 50 includes an additive agent supplying unit 52 that supplies the additive agent, a pipe 54 that transports the first screened material and the additive agent, and a blower 56. In the examples in the drawings, the additive agent is supplied from the additive agent supplying unit 52 to the pipe 54 via the hopper 9. The pipe 54 is contiguous with the pipe 7.

An airflow is generated by the blower 56 in the mixing unit 50, and it is possible to transport the first screened material and the additive agent while being mixed in the pipe 54. The mechanism by which the first screened material and the additive agent are mixed is not particularly limited, and may be a mechanism that performs stirring with blades that rotate at high speed, or may be a mechanism that uses the rotation of a container such as a V-type mixer.

A screw feeder as illustrated in FIG. 1, a disk feeder (not shown), or the like is used as the additive agent supplying unit 52. The additive agent supplied from the additive agent supplying unit 52 includes a resin for causing the plurality of fibers to bond. At the point in time at which the resin is supplied, the plurality of fibers is not bonded. The resin is fused when passing through the sheet forming unit 80 and the plurality of fibers is bonded.

The resin supplied from the additive agent supplying unit 52 is a thermoplastic resin or a heat-curable resin, and is an AS resin, an ABS resin, polypropylene, polyethylene, polyvinyl chloride, polystyrene, an acrylic resin, a polyester resin, polyethylene terephthalate, polyphenylene ether, polybutylene terephthalate, nylon, polyamide, polycarbonate, polyacetal, polyphenylene sulfide, polyetherether ketone, or the like. These resins may be used independently or mixed, as appropriate. The additive agent supplied from the additive agent supplying unit 52 may be in the form of a fiber, or may be in the form of a powder.

The additive agent supplied from the additive agent supplying unit 52 may include, according to the type of sheet manufactured, coloring agents for coloring the fibers, coagulation inhibitors for preventing aggregation of the fibers, and flame retardants for making the fibers and the like more difficult to burn, in addition to the resin that bonds the fibers. The mixture (mixture of the first screened material and the additive agent) passing through the mixing unit 50 is transmitted to the accumulation unit 60 via the pipe 54.

The accumulation unit 60 introduces the mixture passing through the mixing unit 50 from the introduction port 62, refines the entangled defibrated material (fibers) and causes the defibrated material to descend while being dispersed in air. The accumulation unit 60 refines the entangled resin in a case where the resin of the additive agent supplied from the additive agent supplying unit 52 is in the form of a fiber. In so doing, it is possible for the accumulation unit 60 to cause the mixture to be uniformly accumulated on the second web forming unit 70.

The accumulation unit 60 includes a drum portion 61 and a housing portion 63 accommodating the drum portion 61. A cylindrical sieve that rotates is used as the drum portion 61. The drum portion 61 includes a mesh, and causes the fibers of particles (passing through the mesh) included in the mixture passing through the mixing unit 50 and smaller than the size of the mesh openings to descend. The configuration of the drum portion 61 is that same as the configuration of the drum portion 41.

The "sieve" of the drum portion 61 may have not a function of screening specified target materials. That is, the wording "sieve" used as the drum portion 61 signifies a sieve provided with a mesh, and the drum portion 61 may cause all of the mixture introduced to the drum portion 61 to descend.

The second web forming unit 70 accumulates the passing-through material passing through accumulation unit 60 and forms the web W. The second web forming unit 70 includes a mesh belt 72, a tensioned roller 74, and a suction mechanism 76.

The mesh belt 72 accumulates the passing-through material passing through the openings (openings of the mesh) of the accumulation unit 60 while moving. The mesh belt 72 has a configuration in which the mesh belt 72 is tensioned by the tensioned roller 74, and air that does not easily pass through the passing-through material passes therethrough. The mesh belt 72 moves through the tensioned roller 74 rotating. The web W is formed on the mesh belt 72 by the passing-through material passing through the accumulation unit 60 continuously accumulating while the mesh belt 72 continuously moves. The mesh belt 72 is made from a metal, a resin, a fabric, a non-woven fabric or the like.

The suction mechanism 76 is provided below (opposite side to the accumulation unit 60 side) the mesh belt 72. It is possible for the suction mechanism 76 to cause a downward moving airflow (airflow from the accumulation unit 60 to mesh belt 72) to be generated. It is possible for the mixture dispersed in the air by the accumulation unit 60 to be suctioned onto the mesh belt 72 by the suction mechanism 76. In so doing, it is possible for the discharge speed from the accumulation unit 60 to be increased. It is possible to form a down flow in the dropping path of the mixture by the suction mechanism 76, and it is possible to avoid the defibrated material and the additive agent being entangled during dropping.

As above, the web W is formed in a state of including large volumes of air and being softly swelled by passing through the accumulation unit 60 and the second web forming unit 70 (web forming step). The web W accumulated on the mesh belt 72 is transported to the sheet forming unit 80.

In the examples in the drawings, a moisture-adjusting unit 78 that adjusts the moisture of the web W is provided. It is possible for the moisture-adjusting unit 78 to add water or water vapor to the web W and regulate the ratio of the web W to the water.

The sheet forming unit 80 forms the sheet S by pressurizing and heating the web W accumulated on the mesh belt 72. In the sheet forming unit 80, it is possible for the plurality of fibers in the mixture to be bonded to one another via the additive (resin) by applying heat to the mixture of the defibrated material and the additive agent mixed into the web W.

The sheet forming unit 80 is provided with a pressurizing unit 82 that pressurizes the web W, and a heating unit 84 that heats the web W pressurized by the pressurizing unit 82. The pressurizing unit 82 is constituted by a pair of calender rollers 85 and applies pressure to the web W. The web W has the thickness reduced by being pressurized, and a density of the web W is increased. A heating roller (heater roller), a hot press molding machine, a hot plate, a hot air blower, an infrared heating device, or a flash fixing device is used as the heating unit 84. In the examples in the drawings, the heating unit 84 is provided with a pair of heating rollers 86. It is possible to form a sheet S while continuously transporting the web W by configuring the heating unit 84 as heating rollers 86, compared to a case of configuring the heating unit 84 as a plate-like press device (plate press device). Here, the calender roller 85 (pressurizing unit 82) can apply a pressure that is higher than the pressure applied to the web W to the web W by the heating roller 86 (the heating unit 84). Note that, the number of the calender rollers 85 and the heating rollers 86 is not particularly limited.

The cutting unit 90 cut the sheet S formed by the sheet forming unit 80. In the examples in the drawings, the cutting unit 90 includes a first cutting unit 92 that cut the sheet S in a direction that intersects the transport direction of the sheet S and a second cutting unit 94 that cuts the sheet S in a direction parallel to the transport direction. The second cutting unit 94 cuts the sheet S passing through the first cutting unit 92.

As above, a cut-form sheet S with a predetermined size is formed. The cut-form sheet S that is cut is discharged to the discharge unit 96.

1.2. Details of Configuration

The sheet manufacturing apparatus 100 is provided with a defibrating unit 20 that defibrates a raw material containing a fiber in air; a mixing unit 50 that mixes a defibrated material defibrated by the defibrating unit 20 and a resin (additive agent) in air; an accumulation unit 60 and a web forming unit (second web forming unit 70) that form a web W by accumulating the mixture mixed by the mixing unit 50 on a moving body (mesh belt 72); a transporting unit 110 that transports the web W; a sheet forming unit 80 that forms a sheet S from the web W; a setting unit 120 that sets a thickness of the sheet S; and a controller 104 that controls a moving speed of the moving body (mesh belt 72) and a transporting speed of the web W transported by the transporting unit 110, in accordance with the thickness of the sheet S set by the setting unit 120.

Hereinafter, the moving body (mesh belt 72), the transporting unit 110, the setting unit 120, and the controller 104 will be more specifically described. Note that, the defibrating unit 20 and the mixing unit 50 are as described above, and thus a detailed description thereof will not be repeated.

1.2.1. Moving Body

In the sheet manufacturing apparatus 100 of the embodiment, the moving body is configured to move the accumulated position while accumulating the passing-through material passing through the openings (openings of the mesh) of the accumulation unit 60. The moving body of the embodiment is the above-described mesh belt 72. The moving body has an accumulation surface for accumulating the mixtures, and the accumulation surface continuously moves so as to form the web W. The moving speed of the accumulation surface of the moving body is controlled by the controller 104 in accordance with a descending amount of the passing-through material (mixture) descending from the accumulation unit 60, and the thickness of the sheet S set by the setting unit 120.

In a case where the descending amount of the mixture from the accumulation unit 60 does not change, the thickness of the web W to be formed is changed by changing the moving speed of the moving body. In the embodiment, the thickness of the web W is changed by the moving speed of the moving body. Here, for example, when the thickness of the web W is adjusted by increasing the amount of the raw material to be supplied per unit time in the case where the thickness of the sheet S is set to about 2 to 3 times, it is required to enhance the ability of the configuration that is located on the upstream side from the moving body in the flow direction of the material, thereby resulting in an increase in size of each configuration. However, in the embodiment, the thickness of the web W is adjusted in a state in which a steady state is maintained, regarding the configuration located on the upstream side from the moving body in the flow direction of the material. As a result, it is possible to obtain a thick sheet S without increasing the size of the configuration of the apparatus.

Note that, in the following description, the accumulation unit 60 that accumulates the mixtures mixed by the mixing unit 50 on the moving body (the mesh belt 72) and the second web forming unit 70 that forms the web W by accumulating the mixtures may be collectively referred to as a web forming unit.

1.2.2. Transporting Unit

The transporting unit 110 is configured to transport the web W formed by the web forming unit 70 to the first cutting unit 92 in which the sheet S is cut into a single cut, via the sheet forming unit 80. In the example of FIG. 1, three transporting roller pairs of a pair of rollers 90a provided on the upstream side of the first cutting unit 92 and on the downstream side of the heating roller 86; a pair of rollers 90b provided between the first cutting unit 92 and the second cutting unit 94; and a pair of rollers 90c provided on the downstream side of the second cutting unit 94 are provided. The roller pair 90a transports the sheet S to the first cutting unit 92, the roller pair 90b supports the sheet S at the time of cutting the sheet S by the first cutting unit 92, and transports the sheet S cut by the first cutting unit 92 to the second cutting unit 94, and the roller pair 90c discharges the sheet S cut by the second cutting unit 94 to the discharge unit 96.

In the example in FIG. 1, the transporting unit 110 is configured to include a pair of the calender rollers 85, a pair of the heating rollers 86, the roller pair 90a and the roller pair 90b. Note that, in the example in FIG. 1, the first cutting unit 92 is not included in the configuration of the transporting unit 110. The transporting unit 110 transports the web W (the continuous sheet S before being a single cut). As described above, since the fibers are not bonded to each other by the resin, the web W is likely to be stretched by applying a tension. In addition, since the web W has rigidity (so-called stiffness) smaller than the sheet S, even in a case of being stretched in a state where the tension is not applied, the web W is stretched or loosened due to its own weight in some cases.

Note that, the sheet S in the state before cut by the first cutting unit 92 (the continuous state before being a single cut) may not be completely solidified in some cases, and similar to the case of the web W, the sheet may be easily stretched by applying the tension. In addition, even in a case of being stretched in a state where the tension is not applied, the sheet S in the state before cut by the first cutting unit 92 (the continuous state before being a single cut) is stretched or loosened due to its own weight in some cases. For this reason, in the embodiment, the sheet S in the state before cut by the first cutting unit 92 (the continuous state before being a single cut) may be handled in the same manner as the above-described web W.

In addition, although not shown, the transporting unit 110 may include roller pairs other than the above-described roller pairs. Note that, the roller pair is configured to transport the web W (or the continuous sheet S) being sandwiched between the two rollers by rotating the rollers.

In each of the roller pairs of the transporting unit 110 of the embodiment, the transporting speed is controlled by the controller 104 so as to transport the web W (continuous sheet S) while applying appropriate tension, which is not to be stretched, to the web W (continuous sheet S).

1.2.3. Setting Unit

The setting unit 120 can set the thickness of the sheet S manufactured by the sheet manufacturing apparatus 100. The setting unit 120 is provided in, for example, the controller 104 (refer to FIG. 2). The setting unit 120 is provided with, for example, an input device such as a touch panel or a switch, and the user can set the thickness of the sheet S by operating the input device. Alternatively, the setting unit 120 is provided with a communication interface, and the user can set the thickness of the sheet S from a terminal device such as a computer connected to the sheet manufacturing apparatus 100. The setting of the thickness of the sheet S by the setting unit 120 may be configured such that the user selects from a plurality of predetermined (stored) thicknesses (for example, thin, standard, and thick), or may be configured such that the user inputs a numerical value corresponding to the thickness of the sheet S.

The setting (setting value) of the thickness of the sheet S that can be set by the setting unit 120 can be performed to obtain a discrete value or a continuous value. Here, setting the discrete value means that, as in the aspect in which the thickness can be changed in increments of 100 μm, preferably in increments of 50 μm, further preferably in increments of 20 μm, and still further preferably in increments of 10 μm, the settable setting values are discrete to some extent. Further, setting the continuous value means that, as in the aspect in which the thickness can be changed, for example, in increments of 0.5 μm, preferably in increments of 0.3 μm, further preferably in increments of 0.1 μm, and still further preferably in increments of 0.01 μm, the settable setting values are substantially continuous as viewed from the thickness of the sheet S to be manufactured.

In a case where the thickness that can be set by the setting unit 120 is the discrete value, at least two stages of setting can be made. For example, settable value of the thickness of the sheet S set by the setting unit 120 is the first thickness and the second thickness larger than the first thickness. The controller 104 can switch the thickness of the sheet S at a certain timing. For example, switching can be performed when the thickness of the sheet S is input to the setting unit 120 by the user, or after a predetermined number of sheets S are manufactured.

Further, at the time of switching (changing) the thickness of the sheet S, a case of switching the thickness of the sheet S to be larger (for example, in the case of switching from the first thickness to the second thickness) and a case of switching the thickness of the sheet S to be smaller (for example, in the case of switching from the second thickness to the first thickness) occur. Regarding the control in the embodiment, in each of these cases, the moving speed of the moving body and the transporting speed by the transporting unit 110 are controlled by the controller 104 as described below.

1.2.4. Controller

The sheet manufacturing apparatus 100 is controlled by the controller 104 so as to manufacture the sheet S having the thickness set by the setting unit 120. The setting of the thickness of the sheet S set by the setting unit 120 is referred to by the controller 104.

Figure 2:
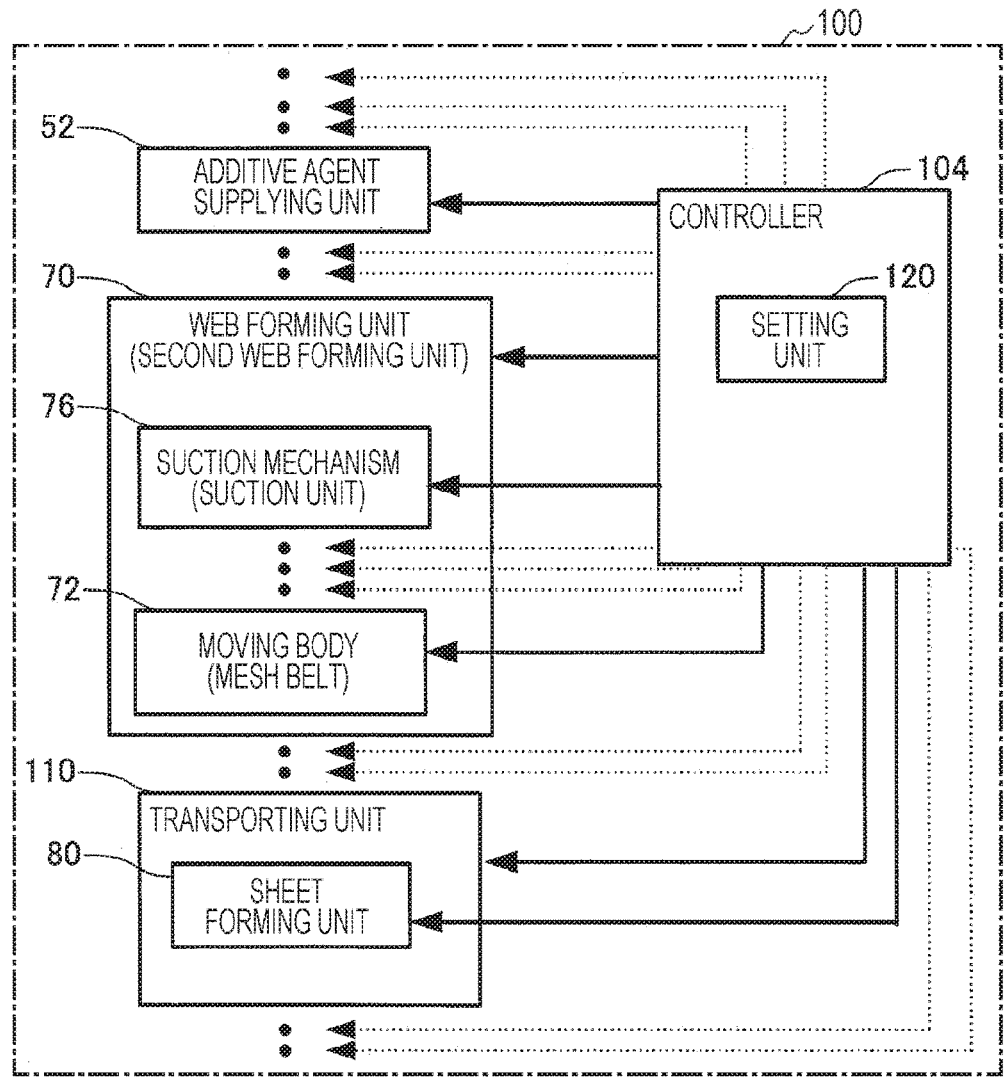
FIG. 2 is a diagram illustrating an example of a functional configuration of the sheet manufacturing apparatus according to the embodiment.

FIG. 2 is a diagram illustrating an example of a functional configuration of the sheet manufacturing apparatus 100 of the embodiment.

The controller 104 controls the entire (each configuration) of the sheet manufacturing apparatus 100. The controller 104 of the embodiment controls at least the additive agent supplying unit 52, the web forming unit (the second web forming unit 70), the suction mechanism 76, the moving body (the mesh belt 72), the transporting unit 110 (at least a pair of calender rollers 85 of the pressurizing unit 82 of the sheet forming unit 80, a pair of heating rollers 86 of the heating unit 84). In addition, the controller 104 obtains the setting of the thickness of the sheet S set by the setting unit 120. The thickness of the sheet S set by the setting unit 120 may be referred to by the controller 104 and stored, and based on the result, the controller 104 may perform the control as follows.

1.3. Control of Moving Speed and Transporting Speed

The controller 104 changes the thickness of the web W by changing the moving speed of the moving body and the transporting speed of the transporting unit 110 in accordance with the setting of the setting unit 120 so as to perform the control of manufacturing the sheet S having the thickness in accordance with the setting.

The thickness of the sheet S is changed in accordance with the thickness of the web W. The thickness of the web W is changed in accordance with the moving speed of the moving body (the mesh belt 72). As the moving speed of the moving body is decreased, the time for accumulating the mixtures descending from the accumulation unit 60 is longer, and thereby it is possible to increase the thickness of the web W. In contrast, as the moving speed of the moving body is increased, the time for accumulating the mixtures descending from the accumulation unit 60 is shorter, and thereby it is possible to decrease the thickness of the web W.

In the sheet manufacturing apparatus 100 of the embodiment, both of the moving speed of the moving body and the transporting speed by the transporting unit 110 are changed in accordance with the setting of the setting unit 120. It is easily understood that when only the moving speed of the moving body is changed, since a speed difference is generated between the moving body and the transporting unit 110 on the downstream side from the moving body, tension is applied to the web W, and thereby the web W is loosened.

Therefore, when both of the moving speed of the moving body and the transporting speed by the transporting unit 110 are changed, in a case where the thickness of the sheet S to be manufactured is changed, tension is more hardly applied to the web W transported between the moving body and the transporting unit 110, and thereby it is less likely that the web W is pulled, and thus is broken or thinned. With this, it is possible to stably manufacture the sheet S. Hereinafter, some examples of such a control will be described.

<Timing of Change of Moving Speed and Transporting Speed>

Regarding the controller 104, in the case where the setting of the setting unit 120 is changed, the controller 104 may change both of the moving speed of the moving body (the mesh belt 72) and the transporting speed of the transporting unit 110 at the same time. In this way, even in a case where the thickness of the sheet S to be manufactured is changed, it is difficult to cause a transport jam to occur, and it is possible to more stably manufacture the sheet.

Further, the controller 104 may decrease the moving speed of the moving body after decreasing the transporting speed of the transporting unit 110 when decreasing the moving speed of the moving body and the transporting speed of the transporting unit 110. That is, in a case where the set thickness of the sheet S is changed to be increased, the moving speed of the moving body and the transporting speed of the transporting unit 110 are decreased; however, at this time, the moving speed of the moving body on the upstream side may be set to be decreased after decreasing the transporting speed of the transporting unit 110 on the downstream side. With this, it is possible to more reliably prevent the tension from being applied to the web W transported between the moving body and the transporting unit 110, and thereby it is less likely that the web W is broken or thinned. Therefore, in the case where the thickness of the sheet S to be manufactured is changed (set) so as to be thick, it is possible to more stably manufacture the sheet.

Further, the controller 104 may increase the transporting speed of the transporting unit 110 after increasing the moving speed of the moving body when increasing the moving speed of the moving body and the transporting speed of the transporting unit 110. That is, in a case where the set thickness of the sheet S is changed to be decreased, the moving speed of the moving body and the transporting speed of the transporting unit 110 are increased; however, at this time, the transporting speed of the transporting unit 110 on the downstream side may be set to be increased after increasing the moving speed of the moving body on the upstream side. With this, tension is more hardly applied to the web W transported between the moving body and the transporting unit 110, and thereby it is less likely that the web W is pulled, and thus is broken or thinned. Therefore, in the case where the thickness of the sheet S to be manufactured is changed (set) so as to be thinned, it is possible to more stably manufacture the sheet.

<Order of Change in Transporting Speed>

In the embodiment, the transporting unit 110 includes the pair of calender rollers 85 of the pressurizing unit 82 of the sheet forming unit 80, the pair of heating rollers 86 of the heating unit 84, and the roller pair 90a provided on the upstream side of the first cutting unit 92 and the downstream side of the heating roller 86, and the roller pair 90b provided on the downstream side of the first cutting unit 92 and the upstream side of the second cutting unit 94. In addition, the transporting unit 110 can include a plurality of roller pairs as described above. That is, it can be said that the transporting unit 110 includes the first roller pair and the second roller pair positioned on the downstream side of the first roller pair. Also in this case, from the same viewpoint as above, the following control may be performed.

Note that, in the embodiment, the transporting unit 110 includes a pair of the calender rollers 85, a pair of the heating rollers 86, the roller pair 90a, and the roller pair 90b. For this reason, in the following description, in a case where the first roller pair is set as a pair of the calender rollers 85, the second roller pair is a pair of the heating rollers 86, in a case where the first roller pair is set as a pair of the heating rollers 86, the second roller pair is the roller pair 90a, and in a case where the first roller pair is set as the roller pair 90a, the second roller pair is the roller pair 90b. In addition, in the aspect that the first roller pair is set as a pair of the calender rollers 85, and the second roller pair is set as a pair of the heating rollers 86, the web W is transported; whereas in the case where the first roller pair is set as a pair of the heating rollers 86, and the second roller pair is set as the roller pair 90a, and in the case where the first roller pair is set as the roller pair 90a, and the second roller pair is set as the roller pair 90b, the continuous sheet S (the web W) is transported.

The controller 104 may decrease the transporting speed of the first roller pair after decreasing the transporting speed of the second roller pair when decreasing the transporting speed of the transporting unit 110. That is, in a case where the set thickness of the sheet S is changed to be increased, the moving speed of the moving body and the transporting speed of the transporting unit 110 are decreased; however, at the time of decreasing the transporting speed of the transporting unit 110, the transporting speed of the first roller pair on the upstream side may be set to be decreased after decreasing the transporting speed of the second roller pair on the downstream side. With this, it is possible to more reliably prevent the tension from being applied to the web W (or the continuous sheet S), and thereby it is less likely that the web W (or the continuous sheet S) is broken or thinned. Therefore, in the case where the thickness of the sheet S to be manufactured is changed (set) so as to be thick, it is possible to more stably manufacture the sheet.

In contrast, the controller 104 may increase the transporting speed of the second roller pair after increasing the transporting speed of the first roller pair when increasing the transporting speed of the transporting unit 110. That is, in a case where the set thickness of the sheet S is changed to be decreased, the moving speed of the moving body and the transporting speed of the transporting unit 110 are increased; however, at the time of increasing the transporting speed of the transporting unit 110, the transporting speed of the first roller pair on the upstream side may be set to be increased after increasing the transporting speed of the second roller pair on the downstream side. With this, the tension is hardly applied to the web W (or the continuous sheet S) transported between the first roller pair and the second roller pair, and thereby it is less likely that the web W (or the continuous sheet S) is pulled, and thus is broken or thinned. Therefore, in the case where the thickness of the sheet S to be manufactured is changed (set) so as to be thinned, it is possible to more stably manufacture the sheet.

<Mode of Changing the Conveying Speed>

Figure 3:
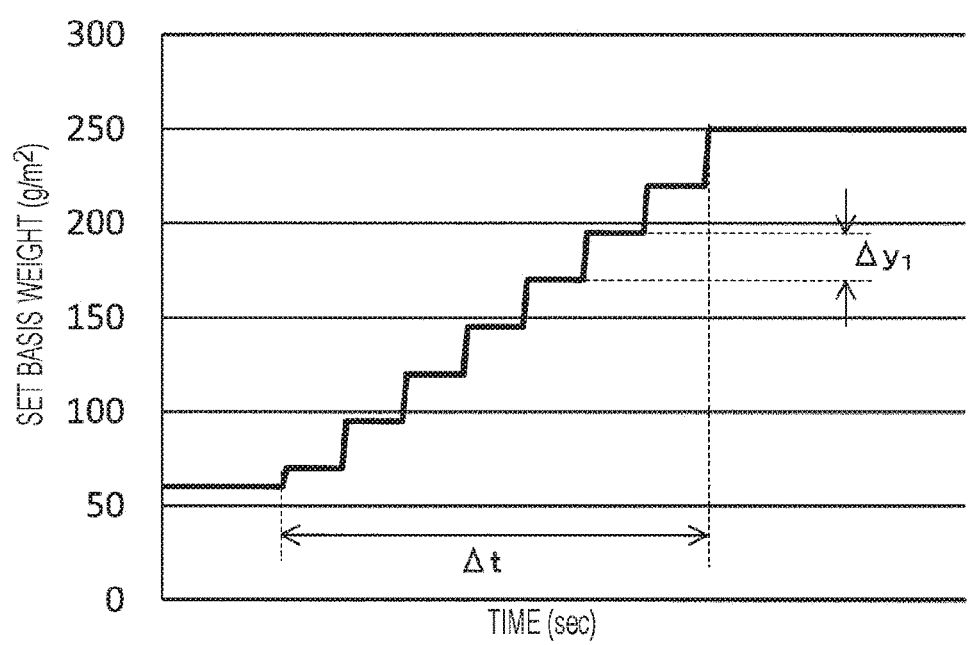
FIG. 3 is a diagram schematically illustrating a time change in basis weight when changing the basis weight.
Figure 4:
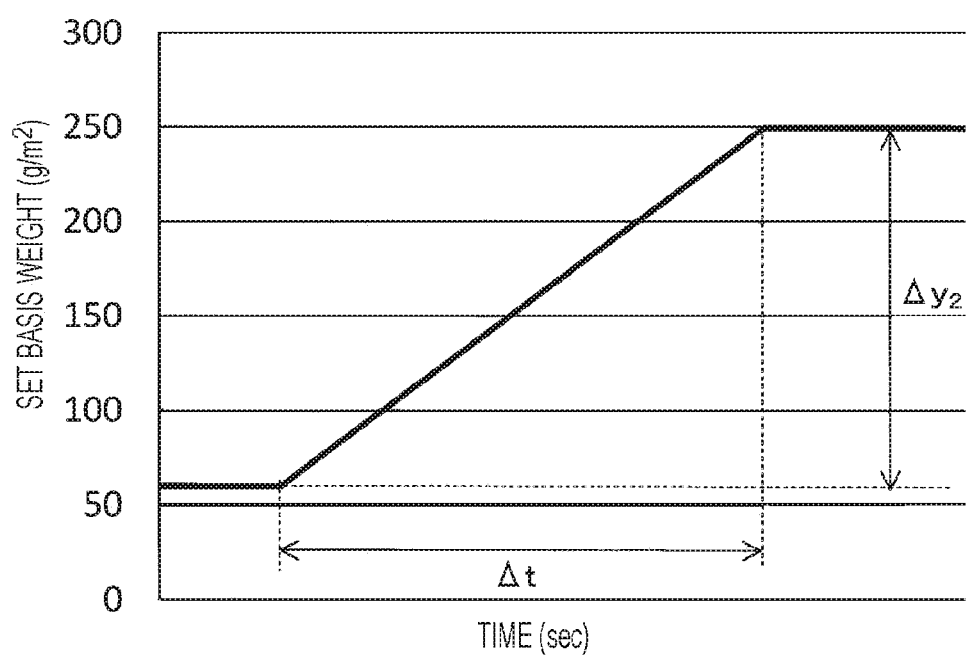
FIG. 4 is a diagram schematically illustrating a time change in basis weight when changing the basis weight.

FIG. 3 and FIG. 4 are diagrams schematically illustrating a time change of the basis weight (weight per unit area) set for changing the thickness of the sheet S. In FIG. 3 and FIG. 4, it is assumed that the density of the raw material is constant, and the change in the basis weight is synonymous with the change in the thickness of the web W and/or the sheet S. Further, in the embodiment, the change in the basis weight corresponds to the speed of the transporting system (the moving body and/or the transporting unit 110), and the increase in the basis weight corresponds to decreasing the speed of the transporting system. Note that, the horizontal axes in FIG. 3 and FIG. 4 indicate the dimension of time, but the unit and scale are optional.

As illustrated in FIG. 3, the controller 104 can stepwisely change each of the moving speed of the moving body and/or the transporting speed of the transporting unit 110. FIG. 3 illustrates an example of a case where the thickness of the sheet S to be manufactured is changed to be lager, which is an example of a case where a first thickness corresponds to a basis weight of 250 (g/m$^2$) is changed to the second thickness corresponding to a basis weight of 60 (g/m$^2$).

FIG. 3 illustrates an example of stepwisely decreasing the transporting speed (increasing in terms of basis weight), and as illustrated in FIG. 3, the set basis weight (transporting speed) is changed in a step shape. The number of steps may be two or more, and the height of one step, that is, the change amount of the set basis weight ($\Delta y_1$) is, for example, as the basis weight, in a range of 2 (g/m$^2$) to 50 (g/m$^2$), is preferably in a range of 5 (g/m$^2$) to 30 (g/m$^2$), and is further preferably in a range of 10 (g/m$^2$) to 20 (g/m$^2$). In addition, a period for change (hereinafter, referred to as change time $\Delta t$) in FIG. 3 is, for example, in a range of 3 seconds to 180 seconds, preferably in a range of 5 seconds to 120 seconds, and further preferably in a range of 10 seconds to 60 seconds.

On the other hand, as illustrated in FIG. 4, the controller 104 can linearly change the moving speed of the moving body and/or the transporting speed of the transporting unit 110. FIG. 4 illustrates an example of a case where the thickness of the sheet S to be manufactured is changed to be larger, which is an example of a case where a first thickness corresponds to a basis weight of 250 (g/m$^2$) is changed to the second thickness corresponding to a basis weight of 60 (g/m$^2$).

FIG. 4 illustrates an example of linearly decreasing the transporting speed (increasing in terms of basis weight), and as illustrated in FIG. 3, the set basis weight (transporting speed) is changed in an inclined straight line shape. A period for change (hereinafter, referred to as change time $\Delta t$) in FIG. 4 is, for example, in a range of 3 seconds to 180 seconds, preferably in a range of 5 seconds to 120 seconds, and further preferably in a range of 10 seconds to 60 seconds. In addition, the change amount of the set basis weight ($\Delta y_2$) is, for example, as the basis weight, in a range of 10 (g/m$^2$) to 300 (g/m$^2$), is preferably in a range of 50 (g/m$^2$) to 200 (g/m$^2$), and is further preferably in a range of 100 (g/m$^2$) to 200 (g/m$^2$). Therefore, the slope of the inclined straight line in the case where the set basis weight is illustrated with respect to time is $\Delta y_2/\Delta t$, and for example, in a range of 0.6 to 100, is preferably in a range of 1 to 50, and is further preferably in a range of 2 to 50.

The mode of change (stepwise change or linear change) of the moving speed of the moving body and/or the transporting speed of the transporting unit 110 by the controller 104 may be configured so that the user can select or set, or may be configured so that the controller 104 selects in accordance with the change amount in the thickness of the sheet S. In a case of the latter, for example, with reference to a table or the like stored in advance, it is possible to control the moving speed of the moving body and/or the transporting speed of the transporting unit 110.

In this manner, when the controller 104 stepwisely or linearly changes each of the moving speed of the moving body and/or the transporting speed of the transporting unit 110, the thickness of the web W is stepwisely or gradually changed. Therefore, the boundary portion where the thickness of the web W becomes larger is easily inserted into the roller pair. In addition, when the boundary portion where the thickness of the web W becomes smaller comes to the roller pair, vibrations and the like are less likely to occur. As a result, even in the case where the thickness of the sheet to be manufactured is changed, it is difficult to cause transport jam or breakage of the web W or the continuous sheet S to occur, and it is possible to more stably manufacture the sheet.

1.4. Control of Other Configurations in Accordance with Change in Transporting Speed <Additive Supplying Unit>

As described above, the sheet manufacturing apparatus 100 of the embodiment includes a supplying unit (additive agent supplying unit 52) that supplies an additive to the mixing unit 50. The amount of the additive supplied by the additive agent supplying unit 52 may be changes in accordance with the thickness of the sheet S (that is, in accordance with the moving speed of the moving body) set by the setting unit 120.

As described above, when the moving speed of the moving body is decreased, the thickness of the web W to be formed becomes larger. Here, as the thickness of the web W to be accumulated becomes larger, the additives (resin) in the material (mixture) may be difficult to come off from the web W in some cases. The reason for this is that as the thickness of the web W becomes larger, the path length for detaching the additive from the web W becomes longer. Therefore, as the moving speed of the moving body is decreased, the proportion of additives (resins) remaining in the web W is increased. In such a case, control may be performed so as to decrease the amount of the additives (resins) supplied from the additive agent supplying unit 52.

In contrast, when the moving speed of the moving body is decreased, the thickness of the web W to be formed becomes smaller. As the thickness of the web W to be accumulated becomes smaller, the additives (resins) in the material (mixture) may be difficult to come off from the web W in some cases. Therefore, as the moving speed of the moving body is increased, the proportion of additives (resins) remaining in the web W is decreased. In such a case, control may be performed so as to increase the amount of the additives (resins) supplied from the additive agent supplying unit 52.

On the other hand, when the moving speed of the moving body is decreased, the time taken for suction by the suction mechanism 76 becomes longer, so that the additives (resins) are easily come off from the web W in some cases. Therefore, as the moving speed of the moving body is decreased, the proportion of additives (resins) remaining in the web W is decreased. In such a case, control may be performed so as to increase the amount of the additives (resins) supplied from the additive agent supplying unit 52.

On the other hand, when the moving speed of the moving body is increased, the time taken for suction by the suction mechanism 76 becomes shorter, so that the additives (resins) are not easily come off from the web W in some cases.

Therefore, as the moving speed of the moving body is increased, the proportion of additives (resins) remaining in the web W is increased. In such a case, control may be performed so as to decrease the amount of the additives (resins) supplied from the additive agent supplying unit 52.

The amount of additives remaining on the web W is changed due to, for example, the thickness of the web W, the size and properties of the additive, and the suction force by the suction mechanism 76, and thus, as described above, it is desirable to appropriately control the amount of additives supplied from the additive supply unit 52.

In this manner, even in a case where the thickness of the sheet S to be manufactured is changed, it is possible to stabilize the amount of the additive agent (abundance) in the sheet S to be manufactured. With this, the mechanical strength of the sheet to be manufactured can be stabilized.

<Suction Unit>

As described above, the sheet manufacturing apparatus 100 of the embodiment includes the suction mechanism 76 (the suction unit) that suctions a mixture dispersed in the air by the accumulation unit 60 onto the mesh belt 72 (the moving body). The suction force of the suction unit may be changes in accordance with the thickness of the sheet S (that is, in accordance with the moving speed of the moving body) set by the setting unit 120.

As described above, when the moving speed of the moving body is increased, the thickness of the web W to be formed becomes smaller. Here, as the thickness of the web W to be accumulated becomes smaller, the additives (resins) in the material (mixture) may be difficult to come off from the web W in some cases. The reason for this is that as the thickness of the web W becomes smaller, the path length for detaching the additive from the web W becomes shorter. Therefore, as the moving speed of the moving body is increased, the proportion of additives (resins) remaining in the web W is decreased. In such a case, control may be performed so as to decrease the suction force of the suction mechanism 76. On the other hand, in a case where the moving speed of the moving body is decreased, control may be performed so as to increase the suction force of the suction mechanism 76.

On the other hand, when the moving speed of the moving body is increased, the time taken for suction by the suction mechanism 76 becomes shorter, so that the additives (resins) are not easily come off from the web W in some cases. Therefore, as the moving speed of the moving body is increased, the proportion of additives (resins) remaining in the web W is increased. In such a case, control may be performed so as to increase the suction force of the suction mechanism 76. On the other hand, in a case where the moving speed of the moving body is decreased, control may be performed so as to decrease the suction force of the suction mechanism 76.

The amount of additives remaining on the web W is changed due to, for example, the thickness of the web W, the size and properties of the additive, and thus, as described above, it is desirable to appropriately control the suction force by the suction mechanism 76.

In this manner, even in a case where the thickness of the sheet S to be manufactured is changed, it is possible to stabilize the amount of the additive agent (abundance) in the sheet S to be manufactured. With this, the mechanical strength of the sheet to be manufactured can be stabilized.

1.5. Control when Apparatus is Stopped

The sheet manufacturing apparatus 100 of the embodiment can be started and stopped at an appropriate timing by a user's operation and/or a timer. On the other hand, as described above, settable value of the thickness of the sheet S set by the setting unit 120 of the sheet manufacturing apparatus 100 is the first thickness and the second thickness larger than the first thickness. Here, the first thickness is, for example, the thickness of a PPC paper generally used in offices. In the embodiment, as described above, the thickness of the sheet having the basis weight of 60 ($g/m^2$) is set as the first thickness, and the thickness of the sheet having the basis weight of 250 ($g/m^2$) is set as the second thickness.

Here, the controller 104 may stop the sheet manufacturing apparatus 100 after setting the moving speed of the moving body and the transporting speed of the transporting unit 110 to a speed in accordance with the relatively small first thickness. For example, the apparatus is stopped when the moving speed of the moving body and the transporting speed of the transporting unit 110 are set to be the speed in accordance with the first thickness, the continuous sheet S having the first thickness is formed, and the sheet S is transported to the cutting unit 90.

In this case, as the sheet manufacturing apparatus 100 is stopped, the web W remains between the moving body and the roller pair of the transporting unit 110 in a case where the moving body and the transporting unit 110 are stopped. In a case of thick web W which is stretched and stopped between the roller pair when the apparatus is stopped, since the fibers are not bonded to each other by the resin, even in a case of being stretched in a state where the tension is not applied, the web W is stretched or loosened due to its own weight in some cases.

For this reason, when the controller 104 stops the sheet manufacturing apparatus 100 after setting the moving speed of the moving body and the transporting speed of the transporting unit 110 to a speed in accordance with the relatively small first thickness, it is possible to reduce the extension of the web W due to the weight of the apparatus itself. That is, since the thickness of the web W remaining between the roller pair when at the time of stop is the first thickness which is relatively thin, the web W is less likely to be loosened, and broken under its own weight. For example, it is possible to stably start the sheet manufacturing apparatus 100 at the time of restart. In the above examples, the sheet manufacturing apparatus 100 is stopped after setting the speed in accordance with the first thickness; however, the sheet manufacturing apparatus 100 may be stopped after setting the speed in accordance with the thickness at which the web W is not broken due to its own weight. For example, the apparatus may be stopped at a speed in accordance with the thickness smaller than the first thickness, or may be stopped at a speed in accordance with the thickness larger than the first thickness and smaller than the second thickness.

2. Sheet Manufacturing Method

A sheet manufacturing method includes a defibrating step of defibrating a raw material containing a fiber in air; a mixing step of mixing a defibrated material defibrated in the defibrating step and a resin in air; a web forming step of forming a web by accumulating the mixture mixed in the mixing step on a moving body; a transporting step of transporting the web; a sheet forming step of forming a sheet from the web; a setting step of setting a thickness of the sheet; and a control step of controlling a moving speed of the moving body and a transporting speed of the web in the transporting step, in accordance with the thickness of the sheet set in the setting step.

These steps can be performed by the above-described sheet manufacturing apparatus 100. The defibrating step, the mixing step, the web forming step, the sheet forming step, the setting step, and the control step can be performed by the above-described defibrating unit 20, the mixing unit 50, the web forming unit 70, the sheet forming unit 80, the setting unit 120, and the controller 104. The details of these steps are the same as those described in the above-described sheet manufacturing apparatus, and thus detailed description will not be repeated.

According to the sheet manufacturing method of the embodiment, both of the moving speed of the moving body in the web forming step and the transporting speed of the web W by the transporting step are controlled in accordance with the thickness of the sheet S set in the setting step. Therefore, for example, in a case where the thickness of the sheet S to be manufactured is set to be larger, tension is more hardly applied to the web W transported between the web forming step and the transporting step, and thereby it is less likely that the web W is pulled, and thus is broken or thinned. In addition, for example, in a case where the thickness of the sheet S to be manufactured is set to be smaller, tension is more hardly applied to the web W transported between the web forming step and the transporting step, and thereby it is less likely that the web W is pulled, and thus is broken or thinned. With this, it is possible to stably manufacture the sheet S.

3. Other Provisions

Although the sheet manufacturing apparatus and the sheet manufacturing method of the embodiment use no or only a small amount of water, it is possible to manufacture the sheet while adding water, as appropriate, with the object of adjusting the moisture or the like, through spraying or the like as necessary.

In the specification, the phrasing "uniform" indicates, in a case of uniform dispersion or mixing, the relative positions where one component is present with respect to the other component are even in the entire system or are the same or substantially equal in each part of the system to one another in a substance able to define a component with two types or more or two phases or more. Uniformity of coloring or uniformity of tone indicates an even concentration without tinting of the color when the sheet is seen in plan view.

In the specification, phrasing such as "uniform", "same", "even intervals" and the like are used to indicate that density, distance, measurement or the like are the same. Although it is desirable that these are equal, because being made completely equal is difficult, the wording includes being shifted by the cumulative errors or variations without the values being equal.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

REFERENCE SIGNS LIST

1 . . . HOPPER
2, 3, 4, 5, 7, 8 . . . PIPE
9 . . . HOPPER
10 . . . SUPPLYING UNIT
12 . . . CRUSHING UNIT
14 . . . CRUSHING BLADE
20 . . . DEFIBRATING UNIT
22 . . . INTRODUCTION PORT
24 . . . EXIT PORT
40 . . . SCREENING UNIT
41 . . . DRUM PORTION
42 . . . INTRODUCTION PORT
43 . . . HOUSING PORTION
44 . . . EXIT PORT
45 . . . FIRST WEB FORMING UNIT
46 . . . MESH BELT
46a . . . ACCUMULATION SURFACE
47, 47a . . . TENSIONED ROLLER
48 . . . SUCTION UNIT
49 . . . ROTATING BODY
49a . . . BASE PORTION
49b . . . PROJECTION
50 . . . MIXING UNIT
52 . . . ADDITIVE AGENT SUPPLYING UNIT
54 . . . PIPE
56 . . . BLOWER
60 . . . ACCUMULATION UNIT
61 . . . DRUM PORTION
62 . . . INTRODUCTION PORT
63 . . . HOUSING PORTION
70 . . . SECOND WEB FORMING UNIT
72 . . . MESH BELT
74 . . . TENSIONED ROLLER
76 . . . SUCTION MECHANISM
78 . . . MOISTURE-ADJUSTING UNIT
80 . . . SHEET FORMING UNIT
82 . . . PRESSURIZING UNIT
84 . . . HEATING UNIT
85 . . . CALENDER ROLLER
86 . . . HEATING ROLLER
90 . . . CUTTING UNIT
90a, 90b, 90c . . . ROLLER PAIR
92 . . . FIRST CUTTING UNIT
94 . . . SECOND CUTTING UNIT
96 . . . DISCHARGE UNIT
100 . . . SHEET MANUFACTURING APPARATUS
102 . . . MANUFACTURING UNIT
104 . . . CONTROLLER
110 . . . TRANSPORTING UNIT
120 . . . SETTING UNIT
S . . . SHEET
V . . . WEB
W . . . WEB

What is claimed is:

1. A sheet manufacturing method comprising:
defibrating a raw material containing a fiber in air;
mixing a resin and a defibrated material defibrated in the defibrating of the raw material in air;
forming a web by accumulating the mixture mixed in the mixing on a moving body;
transporting the web on a downstream side of the moving body in a transporting direction of the web, after the forming of the web;
forming a sheet from the web;
setting a thickness of the sheet; and
controlling a moving speed of the moving body and controlling a transporting speed of the web in the transporting of the web, in accordance with the thickness of the sheet set in the setting of the thickness.

2. The sheet manufacturing method according to claim 1,
wherein in the controlling of the moving speed and the transport speed, the moving speed of the moving body and the transporting speed of the transporting unit change at the same time.

3. The sheet manufacturing method according to claim 1,
wherein in the controlling of the moving speed and the transport speed, the moving speed of the moving body decreases after decreasing the transporting speed of the transporting unit.

4. The sheet manufacturing method according to claim 1,
wherein in the controlling of the moving speed and the transport speed, the moving speed of the moving body increases after increasing the transporting speed of the transporting unit.

5. The sheet manufacturing method according to claim 1,
wherein the transporting of the web is performed by a first roller pair and a second roller pair that is positioned on the downstream side of the first roller pair.

6. The sheet manufacturing method according to claim 5,
wherein in the controlling of the moving speed and the transport speed, the transporting speed of the first roller pair decreases after decreasing the transporting speed of the second roller pair.

7. The sheet manufacturing method according to claim 5,
wherein in the controlling of the moving speed and the transport speed, the transporting speed of the first roller pair increases after increasing the transporting speed of the second roller pair.

8. The sheet manufacturing method according to claim 1,
wherein in the controlling of the moving speed and the transport speed, each of the moving speed of the moving body and the transporting speed of the transporting unit changes stepwise.

9. The sheet manufacturing method according to claim 1,
wherein in the controlling of the moving speed and the transport speed, each of the moving speed of the moving body and the transporting speed of the transporting unit changes linearly.

* * * * *